(12) United States Patent
Avila

(10) Patent No.: US 8,577,101 B2
(45) Date of Patent: Nov. 5, 2013

(54) CHANGE ASSESSMENT METHOD

(75) Inventor: Ricardo S. Avila, Clifton Park, NY (US)

(73) Assignee: Kitware, Inc., Clifton Park, NY (US)

( * ) Notice: Subject to any disclaimer, the term of this patent is extended or adjusted under 35 U.S.C. 154(b) by 1971 days.

(21) Appl. No.: 11/685,758

(22) Filed: Mar. 13, 2007

(65) Prior Publication Data
US 2011/0211743 A1 Sep. 1, 2011

Related U.S. Application Data

(60) Provisional application No. 60/781,376, filed on Mar. 13, 2006.

(51) Int. Cl.
*G06K 9/00* (2006.01)
(52) U.S. Cl.
USPC ............ 382/128; 382/131; 382/132; 382/294
(58) Field of Classification Search
USPC .................................. 382/128, 131.132, 294
See application file for complete search history.

(56) References Cited

U.S. PATENT DOCUMENTS

| 7,142,304 B1* | 11/2006 | Barbour et al. | 356/432 |
| 2005/0135707 A1* | 6/2005 | Turek et al. | 382/294 |

* cited by examiner

*Primary Examiner* — Matthew Bella
*Assistant Examiner* — Julian Brooks
(74) *Attorney, Agent, or Firm* — Todd L. Juneau

(57) ABSTRACT

This invention relates to a method of assessing the change in size of cancerous lesions in humans utilizing CT scans through the application of a boundary detection algorithm capable of detecting subtle changes in CT images. The change assessment method may include the steps for defining boundary regions on a CT scan image, analyzing said boundaries utilizing a computational program containing statistical analysis techniques, and producing a medically useful output showing any change in lesion size. The change assessment method may also be interfaced with other medical diagnostic techniques or devices that are known in the art.

9 Claims, 3 Drawing Sheets

CHANGE ASSESSMENT METHOD

CROSS REFERENCE TO RELATED APPLICATIONS

This application claims benefit under 119(e) of 60/781,376 filed 13 Mar. 2006.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

This invention relates to non-invasive means and method for determining the size of a lesion in lung cancer patients. The current state of the art allows doctors to determine changes in cancerous lesion size only through the use of unaided radiological observation of longitudinal CT exams. Determination of lesion size, or the change in lesion size, is important in the determination of the success of lung cancer treatment. The use of a computer program implementing statistical analysis of CT scans from different timeframes provides for significantly enhanced detection of changes in lesion size.

2. Background of the Invention

The current state of knowledge is as follows.

Accurate assessment of lesion size change in longitudinal high resolution CT scans of the lung is a critical component of lung cancer differential diagnosis as well as lung cancer therapy assessment. The standard method for assessing lesion size change has traditionally relied upon unaided radiological observation of longitudinal CT exams. Even when quantification assistance is provided through the use of electronic calipers operating across one or two dimensions to measure lesion diameter(s), these methods have been shown to yield high inter- and intra-observer misclassification rates[1]. Follow-up CT is commonly used to determine if lung nodule biopsy should be considered, thus a significant improvement in the accuracy and precision of lesion size change has the potential to reduce the unnecessary biopsy rate and reduce the amount of time needed for a meaningful follow-up CT scan. In the context of drug therapy assessment, the impact of an improved metric over the current RECIST criteria[2] could significantly reduce the time and number of patients needed to evaluate drug efficacy.

Significant and sustained improvements in CT acquisition technology over the last decade have made large coverage acquisition of sub-millimeter isotropic resolution CT scans of the lung commonly available. The wide-spread availability of this acquisition technology has led many researchers to explore the potential of volumetric lesion segmentation algorithms in order to characterize lesion change[3-6]. The main advantage of volumetric assessment over uni-dimensional or bi-dimensional lesion diameter measurement resides in the ability to fully measure change over three dimensions. Another important advantage of volumetric segmentation is the ability to perform the measurement objectively, reducing the subjective biases that commonly influence human observers. Although research in this field has shown significant promise, it is widely recognized that the methods developed to date are easily confounded by typical sources of patient and image quality variance found during routine clinical care. Performance of these methods has been shown to degrade rapidly when the full variation of lesion presentations is provided and when acquisition parameters are not strictly controlled. As a result, the research methods and commercial products developed to date have been limited to research use by clinical experts in quantitative imaging. The development of an accurate and precise quantitative method that is robust to common sources of patient and acquisition device variance is a necessary requirement before quantitative assessment methodology can be deployed widely and impact the larger patient population.

An improved change assessment algorithm is needed that is capable of robustly handling the full variance in CT lesion presentation as well as the many different acquisition devices and protocols possible. In particular, a volumetric assessment method that can support a wide range of variation in acquisition devices and acquisition parameters, even along the course of a single patient's longitudinal study, would be beneficial in current clinical care setting as well as in drug clinical trials. Although no measurement method can make up for poor acquisition data, a method can be optimized to obtain the most information from the data available and to provide the user with guidance on the confidence with which a classification has been measured.

BRIEF SUMMARY OF THE INVENTION

A novel aspect of this invention is the use of human operator defined parameters in association with statistical computer analysis to detect changes in cancerous lesion size in order to assist medical professionals in determining appropriate cancer treatment.

A second novel aspect of this invention is the use of homogeneous regions consisting of air in patients to render three dimensional images from which changes in cancerous lesion size may be determined in order to assist medical professionals in determining appropriate cancer treatment.

Certain preferred configurations and uses are described below. The present invention is not limited to these particular configurations and uses.

The present invention can be used to detect changes in cancerous lesion size such that unaided radiological observation of longitudinal CT exams is no longer required, resulting in a more precise diagnostic technique for medical professionals.

In a preferred embodiment, a method for assessing the amount of change of an object in a longitudinal series of medical images consisting of the following steps performed at each imaging time point:

a. a human operator using a tool for defining a boundary region completely inside the object being assessed;

b. a human operator using a tool for defining a boundary region completely outside the object being assessed;

c. a human operator using a tool for identifying corresponding landmarks surrounding the object being assessed;

d. a computational analysis producing signal intensity distribution descriptive statistics for inside and outside the object being assessed;
e. obtaining the point spread function, signal to noise ratio, and other characteristics of the acquisition device;
f. the computation of object boundary regions using an edge detector utilizing knowledge of inside/outside object statistics and acquisition device characteristics;
g. the calculation of a set of surfaces that exist between the inside and outside boundaries representing only those boundaries which can be measured with high confidence;
h. the calculation of a correspondence between the set of high confidence surfaces and the set of high confidence surfaces at the first imaging time point using a deformable registration method;
i. the use of a rigid registration technique based on the landmarks obtained in step (c); and
j. the calculation of local and global change of the object being assessed along with a calculated precision and bias.

In another preferred embodiment, the method of paragraph 18 wherein step (a) is performed using a contour drawing tool or a voxel/pixel painting tool in 2 or more dimensions.

In another preferred embodiment, the method of paragraph 18 wherein step (b) is performed using a contour drawing tool or a voxel/pixel painting tool in 2 or more dimensions.

In another preferred embodiment, the method of paragraph 18 wherein step (c) is performed with a tool that helps identify structural features in the images suitable for use as a landmark.

In another preferred embodiment, the method of paragraph 18 wherein step (c) is performed with an automated image registration technique.

In another preferred embodiment, the method of paragraph 18 wherein steps (a), (b), and (c) are fully automated methods.

In another preferred embodiment, the method of paragraph 18 wherein the calculation of step (g) is performed using, but not limited to, an analysis of surface normal direction, gradient edge strength, and curvature.

In a preferred embodiment, a system capable of performing the method of paragraph 18.

In a preferred embodiment, a method for estimating the Point Spread Function (PSF) and noise characteristics of a CT scan based on an analysis of patient anatomy present within the images consisting of the following steps:
k. detecting large homogeneous regions consisting of air;
l. identifying the trachea and the main bronchial airways;
m. estimating the CT density of the region just outside the airway way;
n. sampling the perpendicular change in CT density along the entire main airway, and;
o. estimating the 3D PSF needed to produce the partial volume intensities sampled across the airway.

In a preferred embodiment, method for identifying the progression of a lesion in a patient in a computer implemented system, comprising the following steps:
a. identifying on a CT scan the anatomical position at time t=0 of one or more high confidence boundary patches on the lesion and collecting a longitudinal dataset relative to the position at t=0;
b. identifying on a CT scan at a later time, t=1, changes in the anatomical position of the one or more high confidence boundary patches and collecting a longitudinal dataset relative to the position at t=1; and
c. assessing lesion progression by comparing the longitudinal datasets from t=0 and t=1.

In a preferred embodiment, a system capable of performing the method of paragraph 27.

In a preferred embodiment, computer readable media containing software program code for performing the method of paragraph 28.

DETAILED DESCRIPTION OF THE INVENTION

Definitions

Figure 1A:
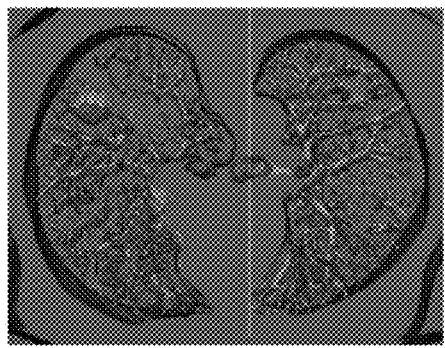
FIGS. 1A and 1B are consecutive CT scans of a human torso showing before (FIG. 1A) and after (FIG. 1B) images of cancerous lesions.

The following definitions are provided as an aid to understanding the detailed description of the present invention.

The phrase "boundary detection," in the field of statistical image manipulation, is a fundamental tool in image processing and computer vision, particularly in the areas of feature detection and feature extraction, which identifies points in a digital image where the image brightness changes sharply or, more formally, has discontinuities.

The phrase "Canny edge detection," in the field of statistical image manipulation, is a technique utilizing an algorithm named for its inventor, wherein the algorithm is applied to a computer image file to detect edges.

The phrase "point spread function (PSF)," in the field of statistical image manipulation, describes the response of an imaging system to a point source or point object. A more general term for the PSF is a system's impulse response, the PSF being the impulse response of a focused optical system. The PSF in many contexts can be thought of as the extended blob in an image that represents an unresolved object. In functional terms it is the spatial domain version of the modulation transfer function. It is a useful concept in Fourier optics, astronomical imaging, electron microscopy and other imaging techniques such as 3D microscopy and fluorescence microscopy. The degree of spreading (blurring) of the point object is a measure for the quality of an imaging system.

The phrase "signal to noise ratio (SNR)," in the field of statistical image manipulation, is a physical measure of the sensitivity of a imaging system. The standard measure of SNR is in decibels (dB) of power and therefore apply the 20 log rule to the "pure" SNR ratio (e.g., a ratio of 1:1 yields 0 decibels).

The phrase "3D Gaussian PSF," in the field of statistical image manipulation, is the application of Gaussian function to 3D image data. The Gausian function acts to filter noise present on raw unprocessed image data by slightly blurring the original image making the filtered image unaffected by a single noisy pixel to any significant degree.

The phrase "Hounsfield Unit (HU) density," in the field of statistical image manipulation, is a unit of measure related to the relative transparency of an object to the passage of x-rays. This is generically referred to as radiodensity, while the Hounsfield scale is fundamental to CT scanning applications. Specifically, distilled water is specified on the Hounsfield scale, as a reference, as 0 units ("HU", or Hounsfield units), air is specified as −1000 HU. These were chosen as universally available references and were oriented to the key application CT was developed for: imaging the internal anatomy of living creatures based on organized water structures and mostly living in air, e.g. humans.

The phrase "deformable registration method," in the field of statistical image manipulation, is a technique used to determine changes in images taken from the same image source. In this technique, a geometric model of the template image dataset is created and subsequently deformed to align with the target. The template is typically a static set of image data. The target can either come from a time sequence of image data taken of the template anatomy during deformation, or from entirely different subjects. From this a transformation map (registration) is formed between the reference image (the template) and the target image set. This transformation map provides for direct comparison of tissue geometrical structures as represented by the image sets.

The phrase "voxel," in the field of statistical image manipulation, is a volume element, representing a value on a regular grid in three dimensional space. This is analogous to a pixel, which represents 2D image data in a bitmap (which is sometimes referred to as a pixmap). As with pixels in a bitmap, voxels themselves do not typically have their position (their coordinates) explicitly encoded along with their values. Instead, the position of a voxel is inferred based upon its position relative to other voxels (i.e., its position in the data structure that makes up a single volumetric image). In contrast to pixels and voxels, points and polygons are often explicitly represented by the coordinates of their vertices.

The phrase "automated image registration technique," in the field of statistical image manipulation, is the application of an automated system, such as a computer program, to the registration of data points from an image.

A boundary detection algorithm that is capable of detecting subtle edges and is resilient to changes in acquisition technique must leverage a fundamental understanding of image acquisition and optimize performance based on acquisition device characteristics. A technique known as Canny edge detection[7] is one such algorithm, capable of identifying the sub-pixel location of a step edge based on basic acquisition device characteristics. More specifically, given the point spread function (PSF) and signal to noise ratio (SNR) of an image scanning device, and a model of the intensity increase expected, a Canny edge detector identifies boundaries within an image that can be localized with high precision and accuracy. Furthermore, researchers have determined optimal parameters for edge detection allowing an algorithm to adapt to image acquisition parameters[8] and compensate for edge localization bias due to local curvature[9].

While edge detection technology provides a strong theoretical foundation for achieving robust tumor boundary localization, there are several practical issues that need to be resolved in order to deliver this technology to clinicians. First, robust edge detection will at the very least rely upon an accurate estimation of the PSF and SNR of the acquisition device. Measuring these characteristics for all possible scanner devices, acquisition protocols, and even patient influenced variations (e.g. SNR partially depends on patient weight) is potentially achievable using phantom studies on all devices, but this would result in a very expensive ongoing scanner characterization cost. These values can be estimated through the analysis of airways in multiple patient CT scans. An automated identification and analysis of the patient's airway provides an excellent source of step edge data for performing a block MTF/PSF estimation. When performed over the full length of the large airways a 3D Gaussian PSF estimation can be obtained. SNR can also be estimated by identifying homogeneous regions in the body, such as the aorta, large vessels, and air filled regions. If the variance and bias of scanner characteristics on edge localization is known at each patient scan time point, the determination of a meaningful change can be calculated despite changes in patient acquisition.

Second, the boundary of lung lesions are not well modeled as a constant step edge and, in fact, it is very common for an edge to entirely disappear when a solid lesion is adjacent to soft tissue of the same Hounsfield Unit (HU) density. This is often the case when lesions are large and are adjacent to a large number of anatomical structures. It would therefore be advantageous to first identify locations along the boundary of the lesion that represent the best locations for performing longitudinal boundary measurement. A clinician's edge finding ability can be leveraged to give a rapid and course inner and outer approximation to the lesion boundary in three dimensions and let the edge detector identify the computational edge in three dimensions. This analysis will result in a collection of surface patches that can be considered with high confidence to be lesion boundaries and will be registered and tracked over time. 3D lesion volume change can be calculated if the entire lesion surface can be identified with high confidence over all time points. Alternatively, sections of lesion surface area that can be measured with high confidence can be registered over time and volumetric changes in the location of each can be measured. This removes the confounding increase in variance when attempting to measure a lesion boundary where none exists, a common problem with current algorithmic methods that measure change at high and low confidence boundaries equally.

A third technical challenge is that a sub-pixel Canny edge detection resulting in closed regions has only been implemented in two dimensions and the extension of the technique to three dimensions faces many non-trivial topological challenges. The approach described here does not require the edge detection to provide closed surfaces that completely contain the lesion. Instead, this approach focuses on using the regions of the surface boundary that can be detected with high confidence. Displacements of these patches with respect to reference points in the anatomy provide an indication of lesion change between two longitudinal datasets. The development of an interactive clinical software tool for rapid lesion outlining reduces the edge detection problem down to one dimension.

In one aspect of the invention, the tool does this, by first requesting the clinical user to indicate the outer lesion boundary in a coarse fashion, then smoothing that initial boundary and identifying the step edge along rays that are perpendicular to the outer lesion boundary.

Figure 1B:
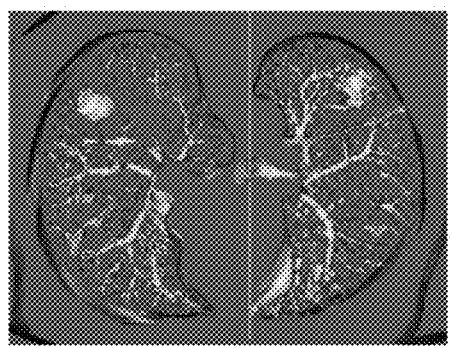

Referring now to FIGS. 1A and 1B, deformable registration is applied to two CT scans of the same thoracic region. The original position of the scans are shown before (FIG. 1A) and after deformable registration (FIG. 1B). FIG. 1B shows high correspondence between t0 (dark areas) and t1 (light areas) structure.

Once high confidence boundary patches are identified, the assessment of lesion progression between two longitudinal datasets is done based on the changes in position of these boundaries with respect to references objects in the anatomy. Deformable registration techniques[10] are used in order to identify the correspondence of high confidence surface area regions between two different datasets over time. FIGS. 1A and 1B show the use of deformable registration on consecutive CT lung scans. Using a two level deformable registration it is possible to solve first for global deformation of the lungs between the two acquisition time points, and then identify the local displacements of the high confidence boundaries that may account for actual lesion changes. The assessment of lesion progression thus becomes the determination of whether a collection of lesion surface area regions is moving outward or inward. The combination of the two levels of deformable registration makes it possible to differentiate lesion size changes from lesion displacements. When this can be reliably determined over a closed lesion surface area, a highly accurate and precise tumor volume is obtained. If only a subset of the lesion surface area is tracked, then the additional volume gained or lost becomes the best estimator of lesion progression available. In some cases where limited lesion boundary information can be extracted, such as lesions on the lung pleura, additional anatomical landmarks may need to be identified and tracked to determine the change of a lesion surface over time.

Figure 2A:
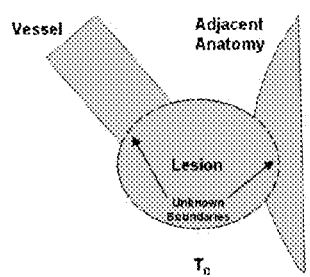
FIGS. 2A, 2B, and 2C are a depiction of the identification and tracking of lesion boundaries over time and the resulting volume difference measurements.
Figure 2B:
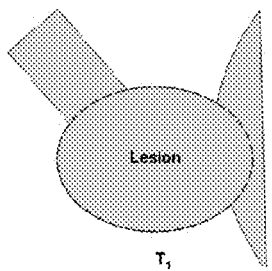
Figure 2C:
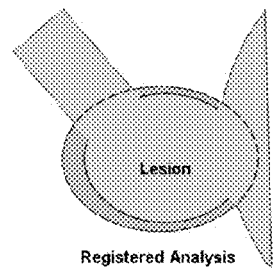

Referring now to FIGS. 2A, 2B, and 2C, an illustration of the identification and tracking of lesion boundaries over time and the resulting volume difference measurement that is calculated only along boundaries that can be measured reliably are shown. This approach avoids the contamination of the tumor growth statistic with areas of lesion measurement that cannot be reliably determined. In addition, the variance and bias associated with each sample measurement is carried through to the final reported change, thereby allowing for the determination of the confidence with which change can be assessed. A small measured change that is well within the compounded variance range expected with the utilized scan devices(s) and protocol(s) are flagged as not large enough given the measurement system.

Still referring to FIGS. 2A, 2B, and 2C, the volumetric assessment algorithm for each time point is summarized below:
1. Automated estimation of acquisition device characteristics.
2. For each CT exam time point
   a. User guided lesion identification in 3D
   b. 3D model-based edge detection yielding surface patches
   c. Two level deformable registration with first time point
3. Calculate change metrics over time
   a. Boundary surface patch volume change and confidence
   b. Estimated total lesion volume change and confidence
4. Determination of whether a meaningful change has occurred.

Figure 3A:
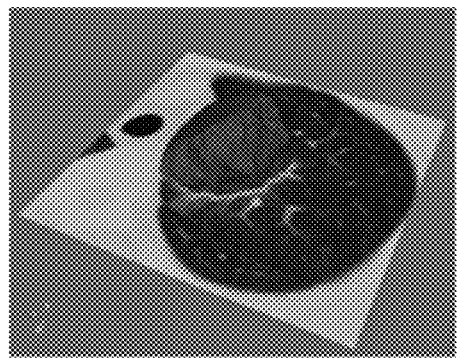
FIGS. 3A and 3B are a 3D depiction of high confidence lesion boundary surface patches at two time points to arrive at the estimated volume change (shaded area).
Figure 3B:
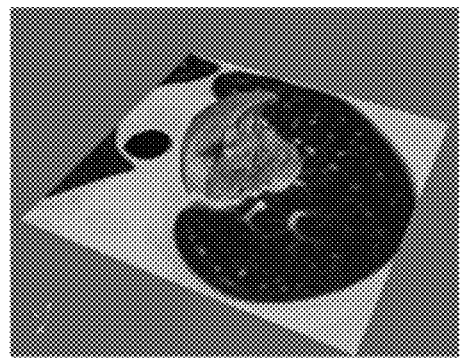

Referring now to FIGS. 3A and 3B, detection and registered tracking of high confidence 3D lesion boundary surface patches at two time points to arrive at the estimated volume change (shaded area) is shown. FIGS. 3A and 3B further show an example of the ability to track high confidence boundaries. The differing levels of shading indicate regions that were determined to be edges that can be tracked at both time points. The colors inside the lesion indicate the amount of displacement of the lesion over the interval between scans.

REFERENCES

References cited above are included herein:
1. Erasmus J J, Gladish G W, Broemeling L, et al. "Interobserver and Intraobserver Variability in Measurement of Non-Small-Cell Carcinoma Lung Lesions: Implications for Assessment of Tumor Response", Journal of Clinical Oncology, Vol 21, Issue 13 (July), 2003: 2574-2582
2. Therasse P, Arbuck S G, Eisenhauer E A, et al. "New guidelines to evaluate the response to treatment in solid tumors", JNCI 2000; 92:205-216.
3. Kostis W P, Reeves A P, Yankelevitz D F, Henschke C I, "Three-dimensional segmentation and growth-rate estimation of small pulmonary nodules in helical CT images", IEEE Transactions on Medical Imaging, 2003 October; 22(10):1259-74.
4. Kostis W P, Reeves A P, Yankelevitz D F, Fluture S C, Henschke C I, "Small pulmonary nodules: reproducibility of three-dimensional volumetric measurement and estimation of time to follow-up CT", Radiology, 2004 May; 231 (2):446-52.
5. Mullally W, Betke M, Wang J, Ko J P, "Segmentation of nodules on chest computed tomography for growth assessment", Medical Physics, 2004 April; 31(4):839-48.
6. Ko J P, Naidich D P, "Lung nodule detection and characterization with multislice CT", Radiol Clin North Am. 2003 May; 41(3):575-97, vi. Review.
7. Canny J F, "A computational approach to edge detection", IEEE PAMI, 8(6):679-698, November 1986.
8. J. Elder, S. W. Zucker, "Local Scale Control for Edge Detection and Blur Estimation," IEEE Trans. Pattern Anal. Machine Intell., 20(7):699-716, 1998.
9. Mendonca P, Padfield D, Miller, J, Turek M, "Bias in the Localization of Curved Edges", European Conference on Computer Vision 2004.
10. Ibanez L, Schroeder W, Ng L, Cates J, "The ITK Software Guide" Aug. 21, 2003.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:
1. A method for assessing the amount of 3-dimensional volumetric change of an object in a longitudinal series of medical images created by an acquisition device consisting of the following steps performed at each imaging time point:
   a. Defining an inner boundary region completely inside the object being assessed;
   b. Defining an outer boundary region completely outside the object being assessed;
   c. Identifying corresponding landmarks surrounding the object being assessed;
   d. Producing signal intensity distribution descriptive statistics for the inner boundary region and for the outer boundary region of the object being assessed;
   e. obtaining a point spread function estimate, and a signal to noise ratio of the acquisition device;
   f. identifying a computational edge in three dimensions using an edge detector that utilizes data comprising the signal intensity distribution descriptive statistics for the inner boundary region and for the outer boundary region, in combination with, the point spread function estimate and the signal to noise ratio of the acquisition device;
   g. calculating a set of high confidence surface patches from said computational edge;
   h. calculating a correspondence using a deformable registration method between the set of high confidence surface patches at a first imaging timepoint in the series of medical images and the set of high confidence surface patches at each subsequent imaging timepoint in the series of medical images;

i. using a rigid registration technique based on the corresponding landmarks surrounding the object being assessed; and j. calculating a three dimensional change over time of the object being assessed.

2. The method of claim 1, further comprising wherein the step of defining an inner boundary region is performed using a contour drawing tool or a voxel/pixel painting tool in 2 or more dimensions.

3. The method of claim 1, further comprising wherein the step of defining an outer boundary region is performed using a contour drawing tool or a voxel/pixel painting tool in 2 or more dimensions.

4. The method of claim 1, further comprising wherein the step of identifying corresponding landmarks is performed with a tool that helps identify structural features in the images suitable for use as a landmark.

5. The method of claim 1, further comprising wherein the step of identifying corresponding landmarks is performed with an automated image registration technique.

6. The method of claim 1, further comprising wherein the steps of defining an inner boundary region, identifying an outer boundary region, and identifying corresponding landmarks are fully automated.

7. The method of claim 1, further comprising wherein the step of calculating a set of high confidence surface patches is calculated using, but not limited to, an analysis of surface normal direction, gradient edge strength, and curvature.

8. A system capable of performing the method of claim 1.

9. Computer readable media containing software program code for the performing the method of claim 1.

* * * * *